(12) United States Patent
Dresel

(10) Patent No.: US 9,435,640 B2
(45) Date of Patent: Sep. 6, 2016

(54) INTERFEROMETER AND METHOD FOR MEASURING NON-ROTATIONALLY SYMMETRIC SURFACE TOPOGRAPHY HAVING UNEQUAL CURVATURES IN TWO PERPENDICULAR PRINCIPAL MERIDIANS

(71) Applicant: Zygo Corporation, Middlefield, CT (US)

(72) Inventor: Thomas Dresel, Nuremberg (DE)

(73) Assignee: Zygo Corporation, Middlefield, CT (US)

( * ) Notice: Subject to any disclaimer, the term of this patent is extended or adjusted under 35 U.S.C. 154(b) by 0 days.

(21) Appl. No.: 14/559,257

(22) Filed: Dec. 3, 2014

(65) Prior Publication Data
US 2015/0153163 A1  Jun. 4, 2015

Related U.S. Application Data

(60) Provisional application No. 61/911,543, filed on Dec. 4, 2013.

(51) Int. Cl.
G01B 11/24 (2006.01)
G01B 9/02 (2006.01)

(52) U.S. Cl.
CPC ....... G01B 11/2441 (2013.01); G01B 9/02039 (2013.01); G01B 9/02085 (2013.01)

(58) Field of Classification Search
CPC .......... G01B 11/2441; G01B 9/02083; G01B 9/02085; G01B 9/02039; G01B 11/24; G01B 11/255; G01B 11/303; G01B 11/306; G01B 9/02057; G01B 9/02072; G01M 11/0271
USPC ........................................................ 356/513
See application file for complete search history.

(56) References Cited

U.S. PATENT DOCUMENTS 3,960,442 A   6/1976  Davis et al.
5,416,586 A   5/1995  Tronolone et al.
(Continued)

FOREIGN PATENT DOCUMENTS

DE          103 25 601 B3   1/2005
DE     10 2006 057 606 B4  12/2008

OTHER PUBLICATIONS

Xi Hou et al., "Full-aperture wavefront reconstruction from annular subaperture interferometric data by use of Zernike annular polynomials and a matrix method for testing large aspheric surfaces", Applied Optics, vol. 45, No. 15, pp. 3442-3455 (May 20, 2006).
(Continued)

Primary Examiner — Michael P Lapage
(74) Attorney, Agent, or Firm — Fish & Richardson P.C.

(57) ABSTRACT

Methods and systems for measuring asymmetric surface topology are described. In one aspect, a method includes directing a test beam including a spherical wave front along an optical axis to reflect from a test surface; combining the test beam reflected from the test surface with a reference beam to form an interferogram on a detector, where the test and reference beams are derived from a common source; and recording the interferogram for each of multiple lateral displacements of the test surface relative to the optical axis. For each recorded interferogram, the curvature of the spherical wave front at the test surface substantially matches a local curvature of the test surface along a first axis orthogonal to the optical axis, and the multiple lateral displacements of the test surface each include a component along a second axis orthogonal to each of the first axis and the optical axis.

25 Claims, 11 Drawing Sheets

(56) References Cited

U.S. PATENT DOCUMENTS

| | | | |
|---|---|---|---|
| 5,889,591 A | 3/1999 | Bruning | |
| 5,960,379 A | 9/1999 | Shimizu et al. | |
| 5,982,490 A * | 11/1999 | Ichikawa | G01J 9/02 356/512 |
| 5,991,035 A | 11/1999 | Bruning | |
| 6,043,886 A | 3/2000 | Bruning | |
| 6,184,994 B1 * | 2/2001 | Freischlad | G01B 11/2441 356/511 |
| 6,750,958 B1 * | 6/2004 | Fantone | G01B 11/00 356/124 |
| 6,879,402 B2 | 4/2005 | Kuechel | |
| 6,956,657 B2 | 10/2005 | Golini et al. | |
| 7,433,057 B2 | 10/2008 | Murphy et al. | |
| 7,495,773 B2 | 2/2009 | Dresel | |
| 7,948,637 B2 | 5/2011 | de Groot | |
| 2004/0178528 A1 | 9/2004 | Diehl | B23B 1/00 264/2.7 |
| 2005/0083537 A1 * | 4/2005 | Kuchel | G01B 11/2441 356/513 |
| 2006/0132708 A1 | 6/2006 | Landgrave et al. | |
| 2007/0201035 A1 * | 8/2007 | Dresel | G01B 11/2441 356/512 |
| 2008/0068613 A1 * | 3/2008 | Kuchel | G01B 11/2441 356/496 |
| 2009/0251702 A1 | 10/2009 | Murphy et al. | |
| 2013/0054192 A1 * | 2/2013 | Vankerkhove | G01B 11/24 702/167 |

OTHER PUBLICATIONS

Daniel Malacara, *Interferogram Analysis for Optical Testing*, Second Edition, Copyright by Taylor & Francis, 546 pages (2005).

M. Otsubo et al., "Measurement of large plane surface shapes by connecting small aperture interferograms," *Optical Engineering*, vol. 33, No. 2, pp. 608-613, (Feb. 1994).

Liang Wang, "Review and Comparison of the Main Interferometric Systems", *The Stitching Algorithm* (Sep. 1996).

Zygo LUPI™ Operating Manual OMP-0448, 58 pages (2000).

Y.J. Fan et al., "Stitching interferometry for the Measurement of Aspheric Surfaces", Annals fo the CIRP, vol. 46, Issue 1, pp. 459-462 (Jan. 7, 1997).

Chunyu Zhao et al., "Stitching of off-axis sub-aperture null measurements of an aspheric surface", *Proc. of SPIE*, vol. 7063, pp. 706316-1-706316-7 (2008).

* cited by examiner

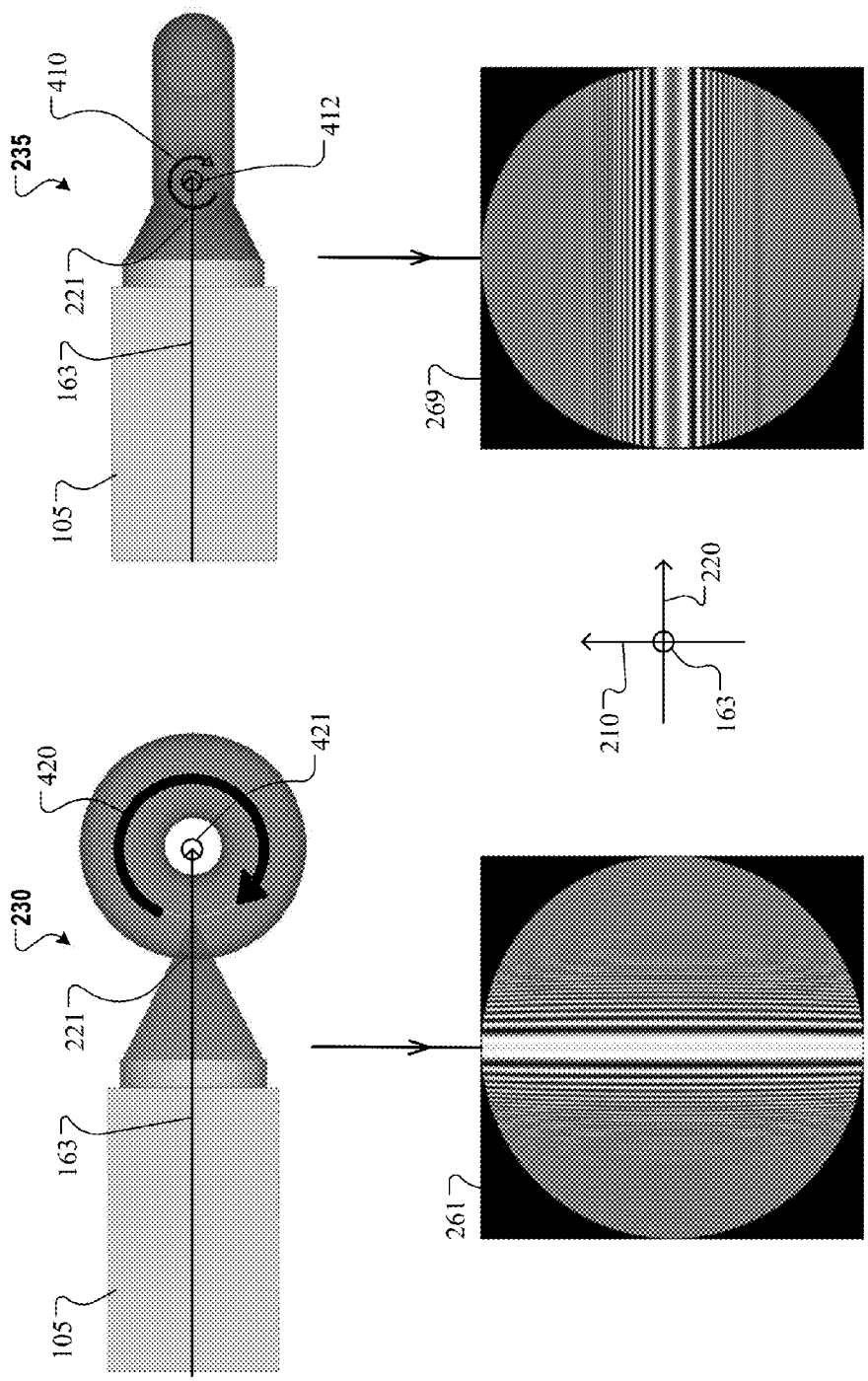

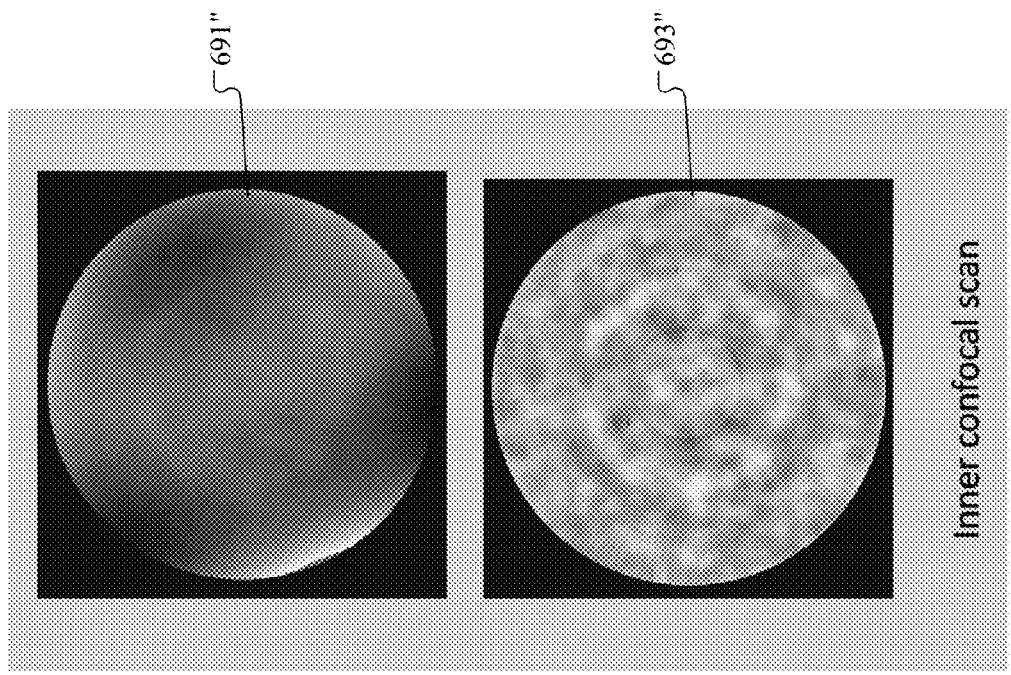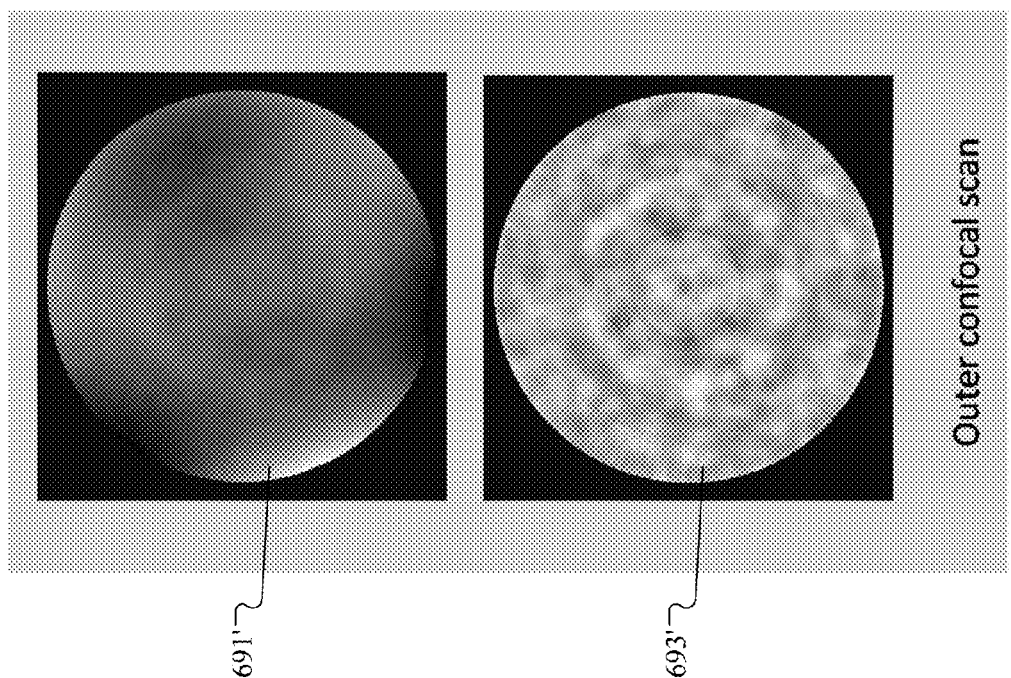
FIG. 6

INTERFEROMETER AND METHOD FOR MEASURING NON-ROTATIONALLY SYMMETRIC SURFACE TOPOGRAPHY HAVING UNEQUAL CURVATURES IN TWO PERPENDICULAR PRINCIPAL MERIDIANS

CLAIM OF PRIORITY

This application claims the benefit of the priority date of U.S. Provisional Patent Application No. 61/911,543, entitled "INTERFEROMETER AND METHOD FOR MEASURING ASSYMETRIC SURFACE TOPOGRAPHY," filed on Dec. 4, 2013, pursuant to 35 USC §119. The entire content of this provisional application is herein incorporated 5 by reference.

BACKGROUND

This specification relates to interferometric optical techniques to characterize profiles of various test surfaces, e.g., toric test surfaces.

Interferometric optical techniques are widely used to measure optical thickness, surface shape, and other geometric and refractive index properties of precision optical components such as glass substrates used in lithographic photomasks, optical lenses, air bearing surfaces of magnetic head sliders, etc.

For example, one can use an interferometer to combine a test beam reflected from a test surface with a reference beam reflected from a reference surface to form an optical interference pattern (also referred to as a fringe pattern). Spatial variations (e.g., dark and bright fringes) in the intensity profile of the optical interference pattern correspond to phase differences between the combined wave fronts of the test and reference beams caused by, for example, variations in the profile of the test surface relative to the reference surface.

Phase-shifting interferometry (PSI) can be used to accurately determine phase differences and a corresponding profile of a measurement surface based on a series of optical interference patterns recorded for each of multiple phase-shifts between the wave fronts of the test and reference beams. For each spatial location of the pattern, the series of optical interference patterns define a series of intensity values, also referred to as interference signal, which depend on the phase difference between the combined wave fronts of the test and reference beams for that spatial location. Using data processing techniques known in the art, the phase difference can be extracted from the interference signal for each spatial location. These phase differences can be used to determine information about the test surface including, for example, a profile of the measurement surface relative the reference surface. Such data processing techniques are referred to as phase evaluation algorithms.

Varying phase-shifts in PSI can be produced by various ways that change the optical path length from the test surface to the interferometer relative to the optical path length from the reference surface to the interferometer. For example, the reference surface can be moved relative to the test surface or a modulator may be placed in one of the beam paths. Alternatively, phase-shifts can be introduced for a constant, non-zero optical path difference by changing the wavelength of the test and reference beams.

SUMMARY

This specification describes technologies used to characterize profiles of test surfaces having asymmetric surface topography using interferometric optical techniques.

In general, one innovative aspect of the subject matter described in this specification can be embodied in interferometry methods that include the actions of directing a test beam including a spherical wave front along an optical axis to reflect from a test surface; combining the test beam reflected from the test surface with a reference beam to form an interferogram on a detector. The test and reference beams are derived from a common source. Additionally, the disclosed interferometry methods include the actions of recording the interferogram for each of multiple lateral displacements of the test surface relative to the optical axis. The disclosed interferometry methods can be used to measure shape characteristics for test surfaces with asymmetric surface topography. Examples of such surfaces are toric or atoric surfaces.

These and other embodiments may each optionally include none, one or more of the following features. For each recorded interferogram, the curvature of the spherical wave front at the test surface can substantially match a local curvature of the test surface along a first axis orthogonal to the optical axis, and the multiple lateral displacements of the test surface each can include a component along a second axis orthogonal to each of the first axis and the optical axis. In some implementations, at least some of the multiple lateral displacements can be caused by moving the test surface along the second axis. In some implementations, at least some of the multiple lateral displacements of can be caused by rotating the test surface about the first axis or an axis parallel to the first axis.

Additionally, an electronic processor can be used to determine a global surface profile for the test surface based on the recorded interferograms. For instance, the electronic processor can determine the global surface profile by determining, for each of the multiple lateral displacements, a local surface profile from corresponding ones of the recorded inteferograms, and stitching together the local surface profiles. The stitching can remove differences in tip, tilt, and piston for the local surface profiles.

In addition, the interferometry methods can include the actions of recording an additional interferogram for each of additional, multiple lateral displacements of the test surface relative to the optical axis, such that for each of the additional recorded interferograms, the curvature of the spherical wave front at the test surface substantially matches a local curvature of the test surface along the second axis, and the additional multiple lateral displacements each include a component along the first axis. For example, an electronic processor can be used to determine a global surface profile for the test surface based on the initial set of recorded interferograms and the additional set of recorded interferograms.

Another innovative aspect of the subject matter described in this specification can be embodied in interferometry systems for characterizing a test surface, the systems including a detector and an interferometer coupled to the detector. The interferometer includes a mount to adjustably position the test surface and is configured to direct a test beam including a spherical wave front along an optical axis to reflect from the test surface, and to combine the reflected test beam with a reference beam to form an interferogram on the detector. The test and reference beams are derived from a common source. The interferometry systems also include an electronic processor coupled to the detector and the interferometer. The electronic processor is programmed to determine a first axis of the test surface based on the interferogram formed on the detector when a curvature of the spherical wave front at the test surface substantially matches a local curvature of the test surface along the determined first axis. The electronic processor is further programmed to instruct the mount to displace the test surface relative to the optical axis such that each of multiple displacements of the test surface comprises a component along a second axis orthogonal to each of the optical axis and the determined first axis, and to record the interferogram for each of the multiple lateral displacements of the test surface. The disclosed interferometric systems can be used to measure shape characteristics for test surfaces with asymmetric surface topography. Examples of such surfaces are toric or atoric surfaces.

These and other embodiments may each optionally include none, one or more of the following features. To determine the first axis of the test surface, the electronic processor can be programmed to instruct the mount to displace the test surface along the optical axis and to tip/tilt the test surface with respect to the optical axis, such that the interferogram formed by the interferometer on the detector has a first minimum density of fringes. Further, the electronic processor can be programmed to detect a direction of fringes of the interferogram that has the first minimum density of fringes, and assign the detected direction to the first axis.

In some implementations, at least some of the multiple displacements of the test surface can be translations along the second axis. In some implementations, at least some of the multiple displacements of the test surface can be rotations about the first axis. Furthermore, the electronic processor can be programmed to determine a global surface profile for the test surface based on the recorded interferograms. For instance, to determine the global surface profile, the electronic processor can be programmed to determine, for each of the multiple displacements, a local surface profile from corresponding ones of the recorded interferograms, and to stitch together the local surface profiles.

In some implementations, the electronic processor can be programmed to instruct the mount to additionally displace the test surface relative to the optical axis, such that each of multiple additional displacements of the test surface includes a component along the first axis, and to record, for each of the additional multiple displacements, an additional interferogram formed on the detector when the curvature of the spherical wave front at the test surface substantially matches a local curvature of the test surface along the second axis. For instance, to record the additional interferogram, the electronic processor can be programmed to instruct the mount to displace the test surface along the optical axis and to tip/tilt the test surface with respect to the optical axis, such that the additional interferogram formed by the interferometer on the detector has a second minimum density of fringes. Moreover, the electronic processor can be programmed to determine a global surface profile for the test surface based on the initially recorded interferograms and the additionally recorded interferograms.

Particular embodiments of the subject matter described in this specification can be implemented so as to realize one or more of the following advantages. The disclosed techniques can be used to measure complete information about the surface shape of the part under test. This includes the two principal surface radii of a toric, the orientation of the toric within the interferometer, and the deviation to the best or nominal torus. The disclosed techniques can be fast, do not require contact with test surface, and can provide accurate measurements of toric surfaces without reducing measurement sensitivity or suffering from anamorphic image distortions. The disclosed techniques are compatible with existing systems and can be implemented without changes in numerous existing interferometric measurement systems, in a cost effective manner.

In addition to being used to measure toric surfaces, the disclosed methods can be used to measure atoric surfaces as well as free form surfaces provided that the test surfaces are sufficiently close to a toric surface. Furthermore, the disclosed methods can be applied to the measurement of either refractive or diffractive optical elements since the optical wave front is measured in all cases.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

FIGS. 4A-4B show aspects of interferometric measurements based upon rotation of a toric test surface.

FIG. 6 shows comparisons between form deviations of a test surface.

Like reference numbers and designations in the various drawings indicate like elements.

DETAILED DESCRIPTION

A spherical interferometer, such as a Fizeau or Twyman-Green interferometer, can be used in conjunction with lateral, rotational or tip/tilt scans to map a profile of a test surface. The test surface can be a toric surface, an atoric surface or another surface having locally-asymmetric shape. The scans can include movements of a test surface (e.g., lateral translations) that cause a pattern of low-density fringes formed on the test surface to sweep across the field of view of the interferometer. Alternatively, as described in detail below, the scans can include other movements of the test surface (e.g., rotations around an axis of symmetry of the test surface) that cause the pattern of low-density fringes formed on the test surface to remain stationary with respect to the field of view. In this way, low-density fringe patterns can cover the whole test surface, staying at or close to a common path condition (corresponding to a minimum fringe density pattern) at all times. Data processing techniques can be used to calculate a sequence of phase maps from the fringe patterns for a range of lateral positions of the test surface. Additionally, the phase maps can be stitched together to obtain a surface map of the whole test surface.

Figure 1A:
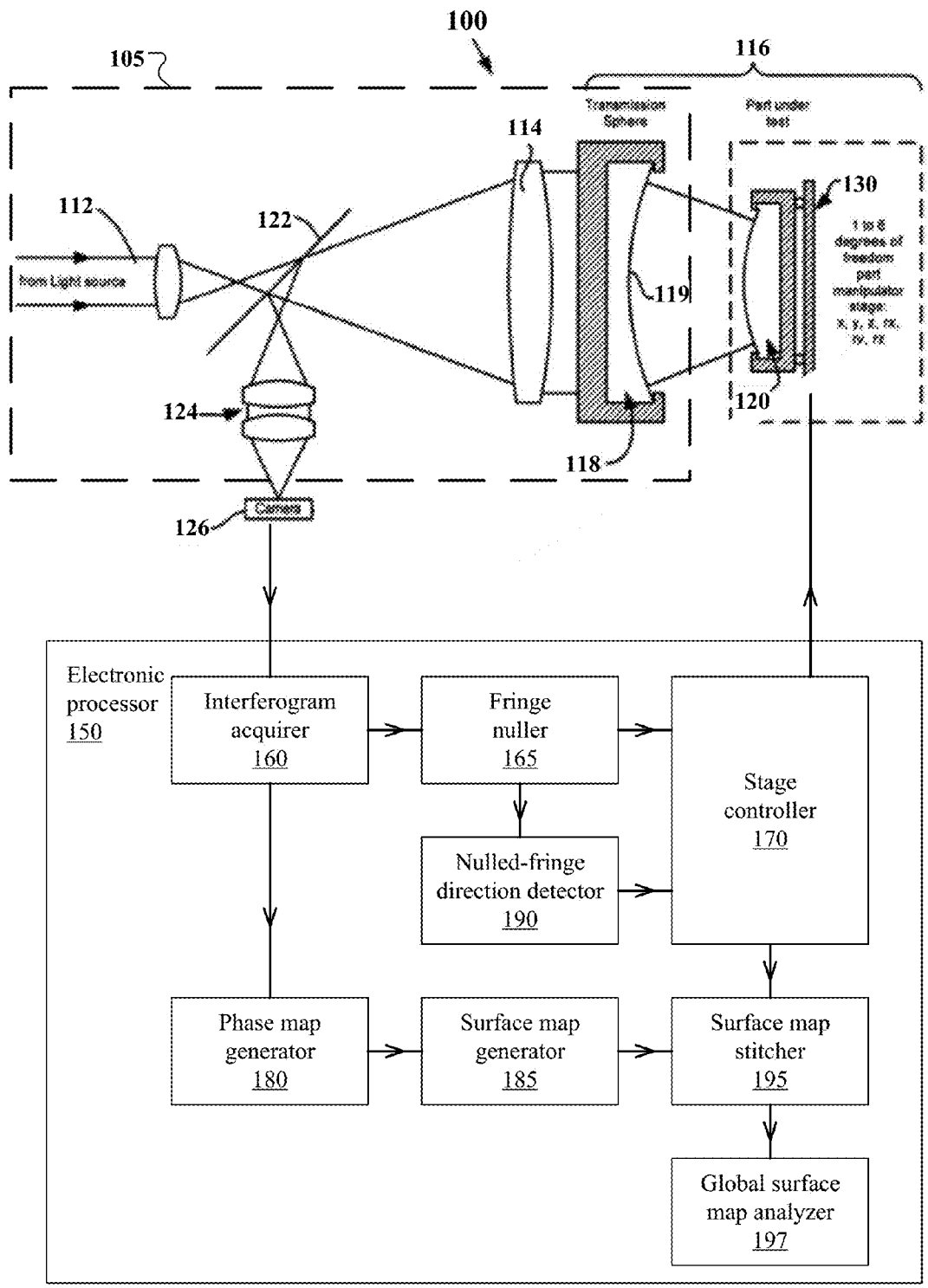
FIG. 1A is schematic diagram of an example of an interferometric measurement system.

FIG. 1A shows an example of an interferometer system 100. A beam 112 coming from a light source is input into the interferometer mainframe 105, expanded by a collimation system 114 and illuminates a spherical Fizeau cavity 116. The light can be partially reflected at the reference surface 119 of a transmission sphere 118 and also at the test surface 120 which can be positioned by manipulator stage 130. The light travels back to a beamsplitter 122, gets reflected there and passes to an imaging system 124, which focuses the test surface from an intermediate plane in the cavity onto a computer controlled camera 126. A recorded image of the interference pattern can be sent to an electronic processor 150.

Interferometer mainframe 105 combines the wave front of the test beam reflected from test surface 120 with a wave front of the reference beam reflected from last surface 119. The interference between these two wave fronts results in a fringe pattern which can be imaged onto camera 126. This image of the fringe pattern is called an interferogram and can be recorded as spatial variations of intensity on the pixels of camera 126. The interferogram contains information about the phase differences between the combined test and reference beams that corresponds to the profile difference of the test and reference surface.

The electronic processor 150 contains modules for processing the fringe patterns acquired by the camera 126. The modules of the electronic processor include an interferogram acquirer 160 used to record interferograms; a fringe nuller 165 and a nulled-fringe direction detector 190 which are used in conjunction with stage controller 170 to instruct the manipulator stage 130 to position the test surface 120 relative to the test beam; a phase map generator 180 that processes the recorded interferograms to obtain corresponding phase maps; and a surface map generator 185, a surface map stitcher 195 and a global surface analyzer 197 used in sequence to obtain distance maps and surface maps of the test surface 120.

There are many possible ways for controlling the required motions between the interferometer mainframe 105 (that represents the wave front measurement system) and the test surface 120. In some implementations, the stage controller 170 can dictate positions of the manipulator stage 130 where test surface 120 is mounted. In some implementations, stage controller 170 also can displace the reference surface 119 to modify a distance between the test surface 120 and the reference surface 119. The manipulator stage 130 includes a stage (e.g., ball-guided stage, flexure stage, air bearing stage driven by stepper motors or piezo-actuators) to address positions of the test surface 120 in two or more degrees of freedom, and sensors that provide positional feedback, such that an actual position of the test surface 120 can be known at any time. Stage controller 170 may or may not have an internal control loop using the sensor feedback to maintain a certain position of manipulator stage 130 which can provide nanometer motion and straightness.

In some implementations, the fringe nuller 165 can instruct the manipulator stage 130 (through the stage controller 170) to position (tip/tilt) the test surface 120 to obtain a fringe pattern having a lowest density of fringes at the center of field of view (e.g., to perform what is known as nulling the fringes of a fringe pattern.) In some implementations, the stage controller 170 can position the reference surface 119 instead of the test surface 120 to null the fringes.

Phase-shifting interferometry (PSI) can be implemented using spherical wave fronts of test and reference beams to characterize a profile of the test surface 120. A change of an optical path length for the test and reference surface can be achieved in various ways. For example, reference surface 119 can be moved relative to the test surface 120. The resulting changes can be recorded as a series of interferograms by interferogram acquirer 160. The series of interferograms can be sent to the phase map generator 180 to generate a phase map. For example, for M (M≥3) of recorded interferograms, a phase ϕ at a given pixel (x,y) can be obtained by $$\phi = -\tan^{-1}\left(\frac{\sum_{i=1}^{M} I_i \sin\alpha_i}{\sum_{i=1}^{M} I_i \cos\alpha_i}\right), \quad (1)$$

where $I_i$ is the intensity at the given pixel (x,y), and $$\alpha_i = \frac{2\pi i}{M}$$

for i=1, . . . , M. By calculating ϕ for all pixels, the phase map can be obtained for the set of M interferograms. Surface map generator 185 scales the obtained phase map by $\lambda/2\pi$ to generate a distance map corresponding to the difference between the reference surface 119 and test surface 120.

Figure 1B:
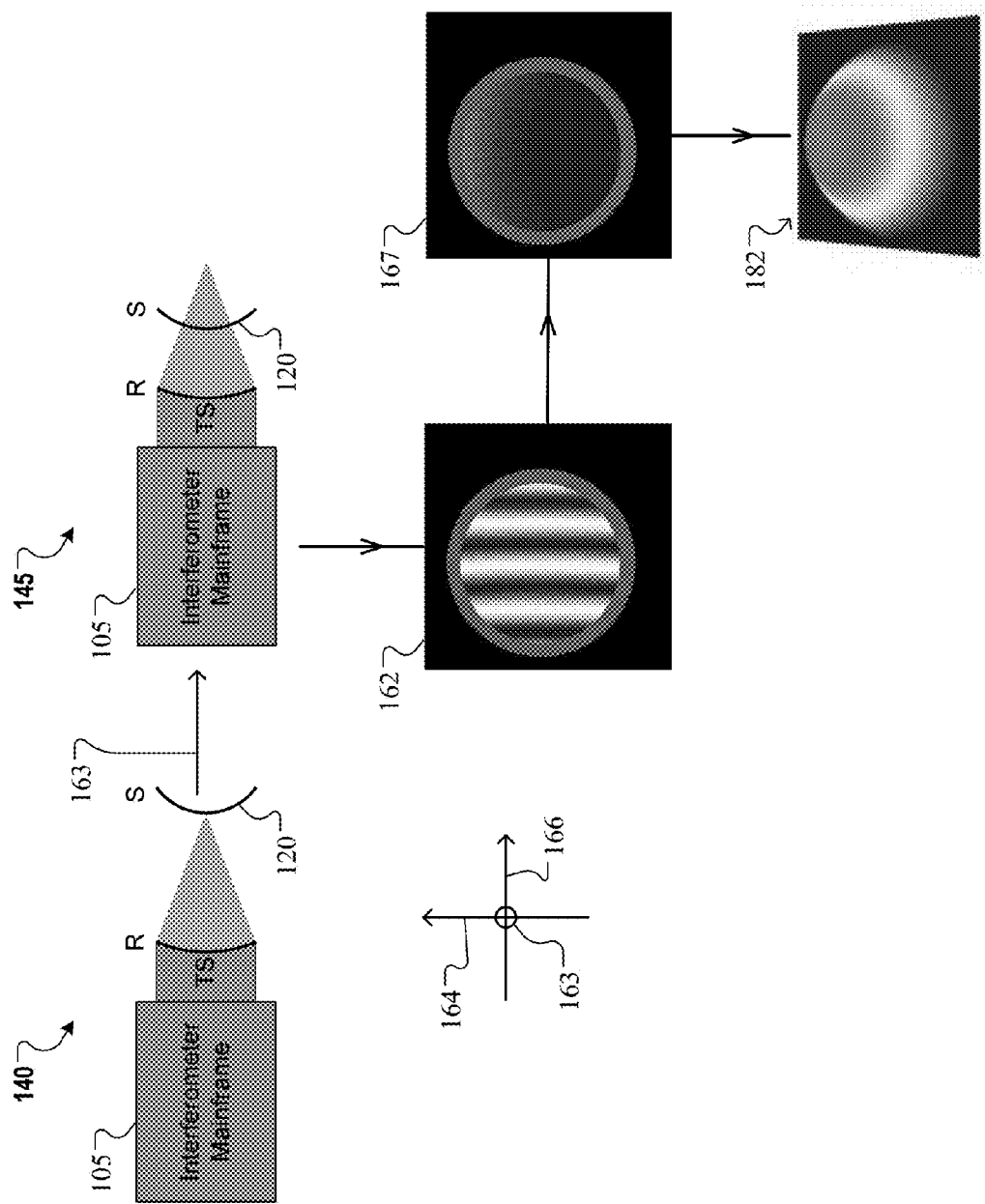
FIG. 1B shows aspects of interferometric measurements performed with the interferometric measurement system from FIG. 1A.

FIG. 1B shows a test beam that is output by an interferometer mainframe 105 at a first relative position with respect to the test surface 120 called a cat's eye position 140 and at a second relative position with respect to the test surface 120 called a confocal position 145. At the cat's eye position 140, the spherical wave front of the test beam is focused on the test surface 120 (illuminating a single point there) and, thus, the spherical wave front is inverted and returned onto itself. Since only a single point on the test surface 120 is illuminated, the actual surface shape does not matter when measuring at this position. Therefore, the cat's eye position 140 can be used as a reference point for measuring a radius of the test surface 120.

Stage controller 170 can be used to instruct the manipulator stage 130 to move the test surface 120 from the cat's eye position 140, along the optical axis 163 (e.g., z-axis), to the confocal position 145. The confocal position 145 is defined as a relative position of the test beam with respect to the test surface 120 at which a curvature of the spherical wave front of the test beam at the test surface 120 substantially matches a local curvature of the test surface 120 along a first axis 164 orthogonal to the optical axis 163. Such matching can be detected by determining that an interferogram (acquired at the confocal position) has fringes parallel to the first axis 164.

In the example illustrated in FIG. 1B, an interferogram 162 acquired at the confocal position 145 has fringes parallel to the first axis 164 (e.g., nulled or minimum density of fringes along the first axis 164.) The fringe pattern of interferogram 162 can indicate that the local curvature of the test surface 120 along a second axis 166 perpendicular to the first axis 164 is the same as the curvature of the test surface 120 along the first axis 164, e.g., a shape of the test surface 120 can have circular symmetry, if the optical axis 163 is tilted with respect to a radius of the test surface 120 (e.g., a source point of the test beam is laterally displaced with respect to the center of the spherical test surface 120.)

However, the fringe pattern of interferogram 162 also can indicate that the local curvature of the test surface 120 along the second axis 166 is different from the curvature of the test surface 120 along the first axis 164 if the second axis 166 is orthogonal with the optical axis 163.

To remove this ambiguity, the fringe nuller 165 can instruct the stage controller 170 to maintain a position of the test surface 120 at the confocal position 145, but to rotate (tip/tilt) the test surface 120 around the first axis 164 or to translate the test surface 120 with respect to the optical axis 163 to align the latter to the radius of the spherical test surface 120. In this manner, the fringe nuller 165 can reduce the density of the fringes (e.g., to null the fringes) in the interferogram 162 along the second axis 166. After a rotation of the test surface 120 around the first axis 164, the interferogram acquirer 160 can record an interferogram 167. The fringes of interferogram 167 are nulled (i.e., the intensity pattern over the entire field of view of the test surface 120 is constant), and the curvature of the spherical wave front of the test beam at the test surface 120 substantially matches local curvatures of the test surface 120 along each one of the first 164 and second 166 axes. The combined results shown in interferograms 162 and 167 indicate that the test surface 120 can have spherical shape.

In other situations, an interferogram (not shown) acquired near the confocal position 145 can have rotationally symmetric fringes (also referred to as power-fringes), which are indicative of a displacement (misalignment) of the spherical test surface 120 along the optical axis 163 with respect to the spherical wave front of the test beam. In such cases, the fringe nuller 165 can instruct the stage controller 170 to move the test surface 120 along the optical axis 163 to best-null the fringes and obtain interferogram 167.

At the confocal position 145, a sequence of M interferograms (similar to interferogram 167) can be acquired and processed by the phase map generator 180, in accordance with equation (1), to obtain a phase map. The phase map can be further processed by the surface map generator 185 to obtain a surface map 182 of the test surface 120. As described above, in the example illustrated in FIG. 1B, the shape of the test surface 120 is spherical.

Figure 2A:
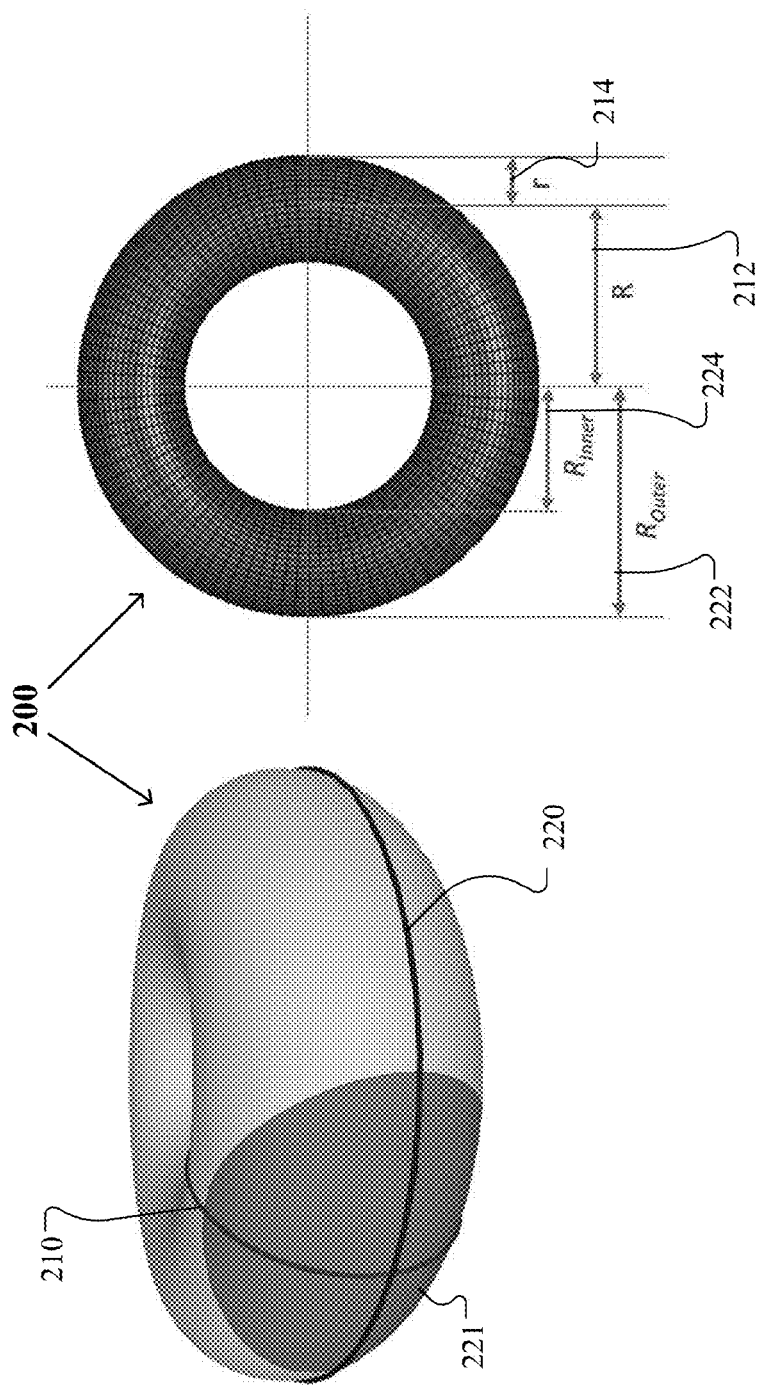
FIG. 2A illustrates a test surface with a toric shape.

FIG. 2A shows a test surface 221 which is a segment of a torus 200. The test surface 221 is said to be a toric surface (also referred to as the toric test surface 221.) The torus 200 can be defined in various ways. For example, the torus 200 can be defined in terms of an outer radius 222 that corresponds to the equator circle 220 of the torus 200, and an inner radius 224. As another example, the torus 200 can be defined in terms of a torus radius 212, and a tube radius 214, the latter one corresponding to a meridian circle 210 of the torus 200. Moreover, the outer radius 222 and the tube radius 214 represent two perpendicular principal axes which can fully define the torus 200. As the toric test surface 221 stems from the torus 200, a shape of the toric test surface 221 can be characterized in terms of the outer radius 222 and the tube radius 214, because these also are the radii of the two principal curvatures of the toric surface 221. In general, a non-rotationally symmetric surface (e.g., 221) with unequal curvatures (e.g., 214 and 222) in principal meridians perpendicular to each other (e.g., 210 and 220,) of which both curvatures are circular in shape, is known as a toroidal surface, or torus in short. The outer radius 222 and the tube radius 214 primarily define how light rays refract or reflect at the toric test surface 221.

The systems and techniques described in this specification can be used to measure shape characteristics of a test surface 221 having a toric shape and will be described as such for the purpose of clarity. However, the disclosed technologies also can be used to measure shape characteristics of atoric test surfaces. As used herein, an atoric surface, or atoms in short, is a non-rotationally symmetric surface with unequal curvatures in principal meridians perpendicular to each other, of which at least one curvature is not circular in shape.

Figure 2B:
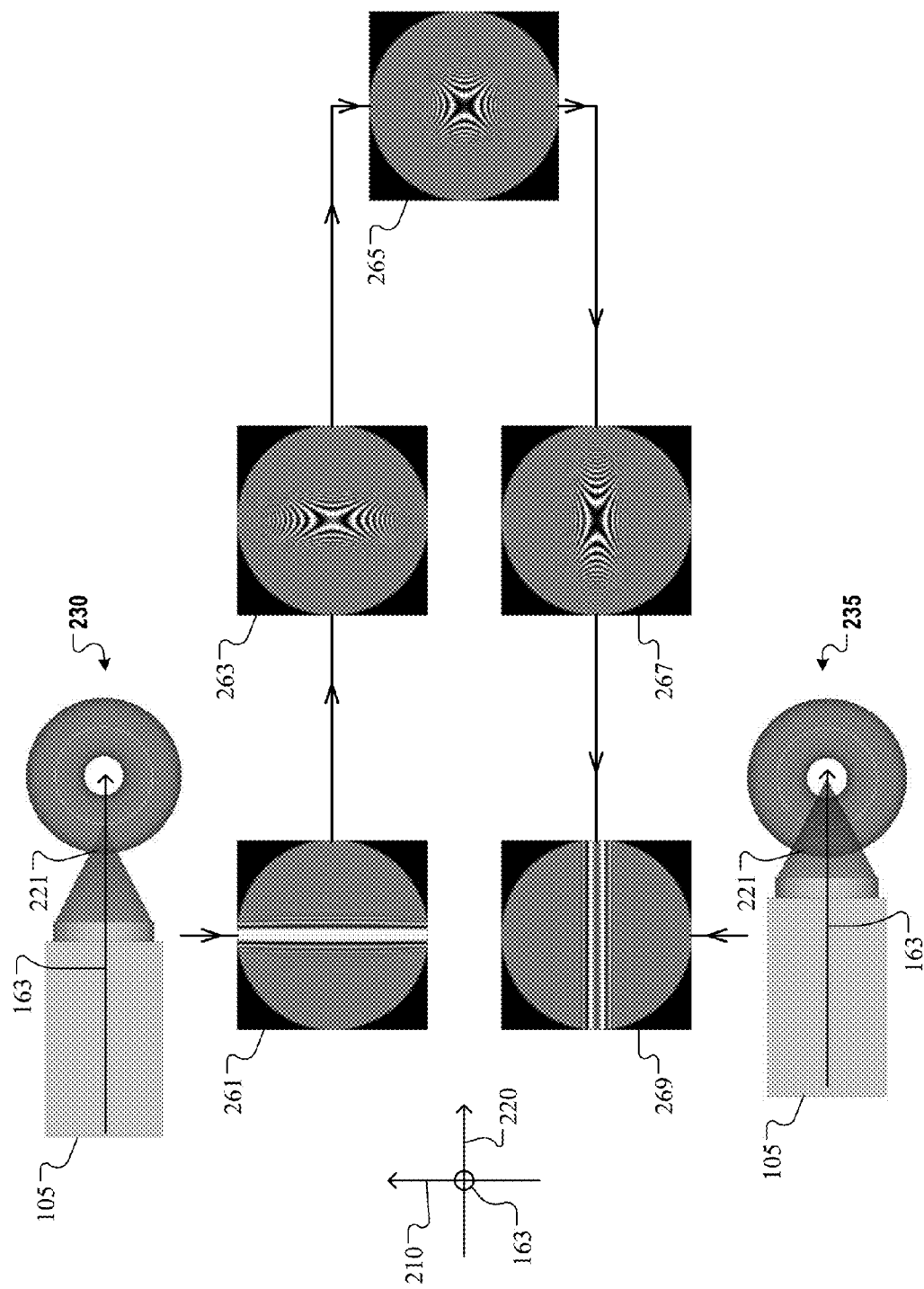
FIG. 2B shows a sequence of interferograms corresponding to a toric surface obtained when scanning from an inner confocal position to an outer confocal position.

FIG. 2B shows a sequence of interferograms 261, 263, 265, 267, and 269 corresponding to a toric test surface 221 that are obtained as the focus position of a spherical front of a test beam output by the interferometer mainframe 105 is scanned along the optical axis 163, from an inner confocal position 230 to an outer confocal position 235. At the inner confocal position 230, the curvature of the spherical wave front of the test beam at the toric test surface 221 substantially matches the tube radius 214 of the torus 200 associated with the toric test surface 221. This condition is fulfilled if the focus of the spherical wave front is positioned at the center of a meridian circle 210 of the torus 200. Fulfillment of the matching condition can be detected by determining that the interferogram 261 acquired at the inner confocal position 230 has fringes along (parallel with) the meridian circle 210. At the outer confocal position 235, the curvature of the spherical wave front of the test beam at the toric test surface 221 substantially matches the outer radius 222 of the torus 200 associated with the toric test surface 221. This condition is fulfilled if the focus of the spherical wave front is positioned at the center of the equator circle 220 of the torus 200. Fulfillment of the latter matching condition can be detected by determining that the interferogram 269 acquired at the outer confocal position 230 has fringes along (parallel with) the equator circle 220.

In addition, fringe densities corresponding to interferograms acquired at the cat's eye position 140, the inner confocal position 230, and the outer confocal position 235 are minimized at the center of the field of view. For instance, in the cat's eye position 140, the fringe density is zero across the whole field of view. Moreover, at each of the inner 230 and outer 235 confocal positions, the fringe density in the center of the field of view is minimum (e.g., zero) at least along a circle that has a radius that is substantially matched by the radius of the spherical wave front of the test beam at the toric test surface 221. In this manner, the broadest fringe corresponding to the matched radius goes through the center of the field of view.

Z-scanning Fizeau interferometry, e.g., described above in connection with FIGS. 1A-1B, can be used for measuring surface shape of rotationally symmetric aspheres. In the latter case, interferograms including rotationally symmetric fringe patterns may be acquired. For example, as the test surface 120 is scanned along the z-axis 163 of the interferometer mainframe 105, these rotationally symmetric fringe patterns can move radially across the whole test surface 120. However, z-scanning Fizeau interferometry cannot be used to provide a surface map of the toric test surface 221 because, although there is fringe contrast for the central pixels of each of interferograms 261, 263, 265, 267, and 269, the corresponding fringe densities are too large for pixels in the corners of the field of view to provide useful phase information.

The systems and techniques described in this specification can laterally move or tilt the toric test surface 221 such that a first minimum fringe density pattern (corresponding to first nulled fringes) shown in the interferogram 261 acquired at the inner confocal position 230 or a second minimum fringe density pattern (corresponding to second null fringes) shown in the interferogram 269 acquired at the outer confocal position 230 moves across the toric test surface 221. In addition, the spherical wave front of the test beam can be tilted independently or in combination with the movement of the toric test surface 221 such that either one of the two minimum fringe density patterns moves across the toric test surface 221. These scanning techniques can be combined with different fringe processing techniques, as described below in connection with FIG. 5, to reconstruct a shape of the toric test surface 221.

In some implementations, a continuous scan with synchronized data acquisition can be performed. For example, the toric test surface 221 can be moved laterally, rotated or tip/tilted in one dimension and a stack of interferograms can be recorded. The continuous scan can include thousands of images, for instance. Each pixel of the image stack contains a trace of the intensity variation and can be evaluated individually. This pixel trace can show high contrast fringes at times when the pixel is in a region of the first or second nulled fringes. Phase evaluation algorithms allow extracting phase information from each pixel trace. The phase relationships between the pixels then give the height information about the toric test surface 221. The interferometer system 100 can be characterized in terms of magnification and distortion so that the image coordinate system and its relation to the toric test surface coordinate system are known.

In other implementations, a step and scan approach can be used. In this approach, the toric test surface 221 is standing at either the inner confocal position 230 or the outer confocal position 235 and a phase shifting measurement of the interferometer cavity 116 is executed, typically by phase shifting the reference surface 119 along the optical axis 163 and taking, by the interferogram acquirer 160, a set of M interferograms (e.g., M=5, 7, 11, or 13) corresponding to the interferogram 261 or the interferogram 269. A phase map can be calculated from this set of M interferograms by the phase map generator 180. Then, the stage controller 170 can instruct the manipulator stage 130 to move the toric test surface 221 in a lateral, rotational or tip/tilt motion by a step such that another low fringe density pattern has an overlap with the previous low fringe density pattern. At this step, another phase measurement is executed and a second phase map is stored. By repeating this procedure, the toric test surface can be covered with a collection of phase maps, where each individual phase map only contains a strip of valid data. In these step and scan implementations, the mechanical requirements on the manipulator stage 130 are much reduced compared to the continuous scan implementations described above. For example, the manipulator stage 130 may just be accurate enough to allow tracking motion of the toric test surface 221 on the micrometer scale (for compensating the image motion), but nanometer motion is not required.

Another aspect of the disclosed technologies is that in addition to acquiring surface shape information, the two radii 214 and 222 of the torus 200 can be measured by moving the toric test surface 221 along the optical axis 163 between the cat's eye and the confocal positions. As described below in connection with FIG. 5, this allows reconstructing the full 3d-surface, and then determining the deviation from a best matching or a nominal torus.

Figure 3A:
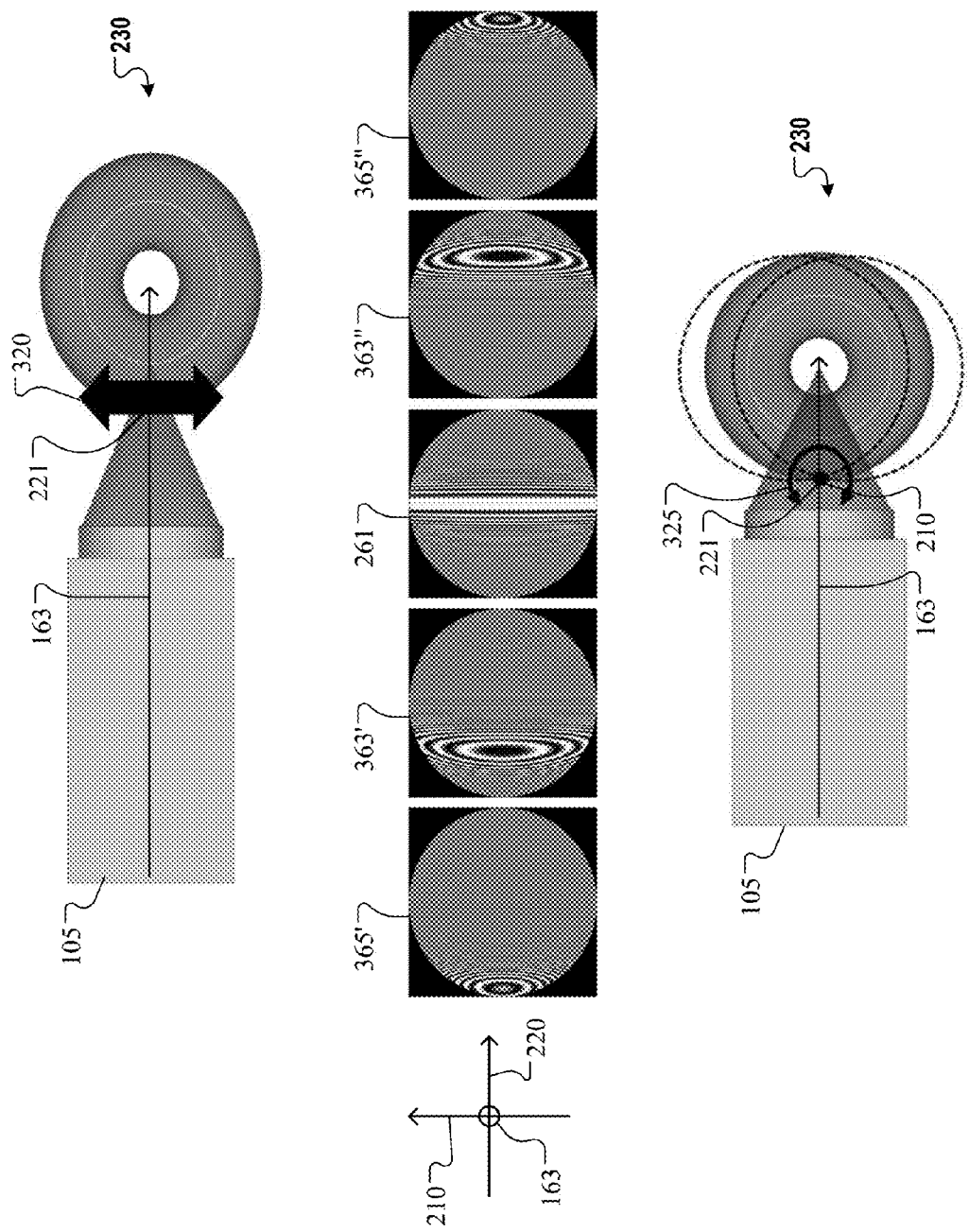
FIGS. 3A-3B show aspects of interferometric measurements based on lateral translations or tilts of a toric test surface.

FIG. 3A shows aspects of an interferometric measurement based on laterally scanning a minimum fringe density pattern over the toric test surface 221, at the inner confocal position 230. The interferometer mainframe 105 can use a scan along the optical axis 163 to first obtain the tube radius 214 of the toric test surface 221 in the following manner. The stage controller 170 can instruct the manipulator stage 130 to move the toric test surface 221 between the cat's eye 140 and the inner confocal position 230 along the optical axis 163, and to measure and record exact locations between these positions. At the inner confocal position 230, a radius of the spherical wave front of the test beam at the toric test surface 221 substantially matches the tube radius 214 of the toric test surface 221. Fulfillment of this matching condition results in a minimum fringe density pattern in the direction of the meridian circle 210 of the torus 200, as illustrated in the interferogram 261.

Further, the interferometer mainframe 105 can acquire a set of M interferograms (similar to the interferogram 261) at the inner confocal position 230 to obtain a phase map corresponding to the minimum fringe density pattern of the interferogram 261. In some implementations, after acquiring the set of M interferograms, a manipulator stage 130 having a single translation axis can move the toric test surface laterally. To achieve this, the axis 220 of toric 221 has to be aligned to the single translation axis of the stage manipulator 130. This requirement can be relaxed if the stage manipulator 130 has multiple translation and rotation axes.

In some implementations, the interferometric system 100 can have a stage manipulator with 5 or 6 axes. In the latter implementations, a nulled-fringe direction detector 190 can determine a first direction 210 perpendicular to the optical axis 163 and parallel to fringes of the minimum fringe density pattern of the interferogram 261 acquired at the inner confocal position 230. Moreover, the stage controller 170 can instruct the manipulator stage 130 to perform a lateral scan 320 in a second direction 220 perpendicular to the detected first direction 210. The lateral scan 320 of the toric test surface 221 in the second direction 220 causes a translation of the minimum fringe density pattern of the interferogram 261 along the second direction 220. As the toric test surface 221 is moved laterally in the second direction 220, various amounts of fringe tilt are added to the interferometer phase resulting in a movement of the minimum fringe density pattern of the interferogram 261 across the field of view. As a result, interferograms 363' and 365' or 363" and 365" having corresponding translated minimum fringe density patterns can be acquired for corresponding lateral displacements of the toric test surface 221.

Alternatively, the stage controller 170 can instruct the manipulator stage 130 to perform a rotation 325 of the toric test surface 221 around an axis 210 by tipping or tilting the manipulator stage 130. In this case, the rotation axis 210 is tangential to the toric test surface 221, is perpendicular to the optical axis 169, and is parallel to the detected first direction 210. A lateral component of the rotation 325 causes a translation of the minimum fringe density pattern of the interferogram 261 along the second direction 220. Accordingly, the interferograms 363' and 365' or 363" and 365" having corresponding translated low fringe density patterns can be acquired for corresponding rotations of the toric test surface 221.

Figure 3B:
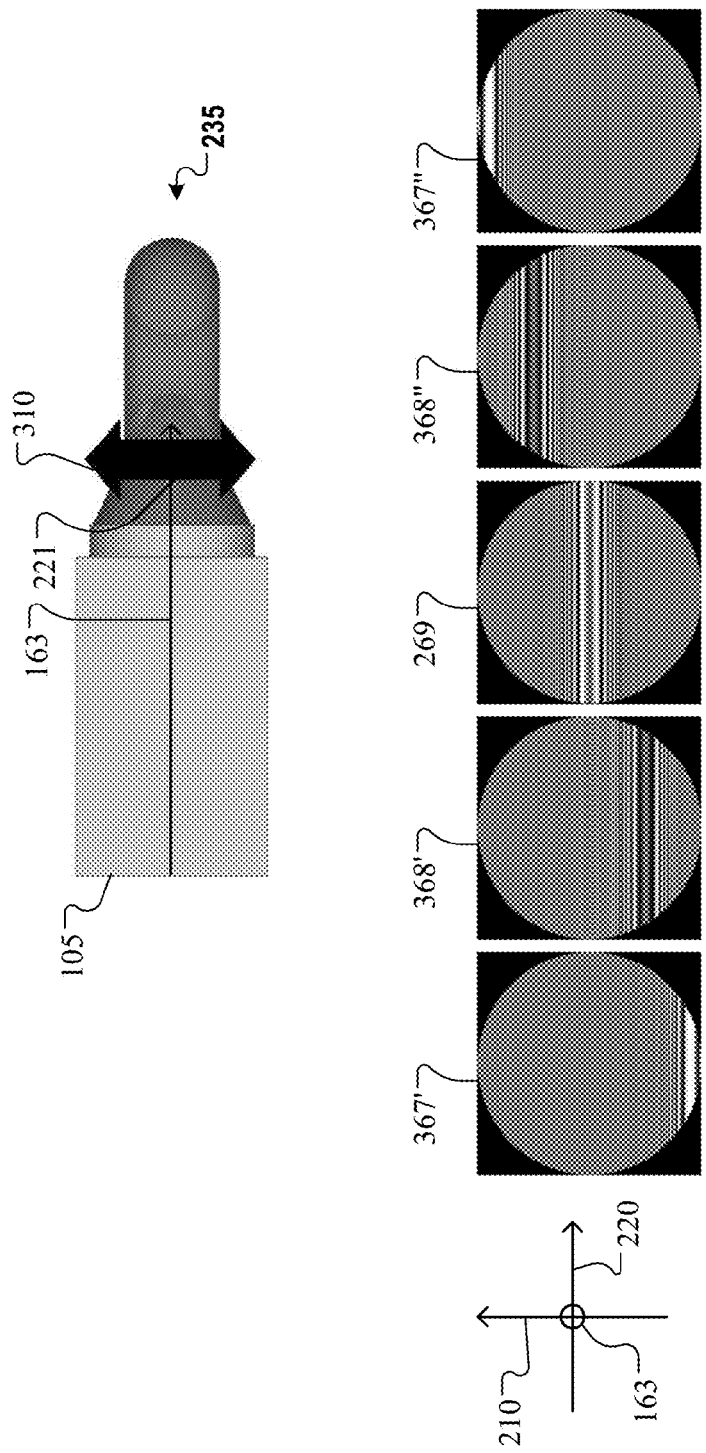

FIG. 3B shows aspects of an interferometric measurement based on laterally scanning a minimum fringe density pattern over the toric test surface 221, at the outer confocal position 235. The interferometer mainframe 105 can use a scan along the optical axis 163 to first obtain the outer radius 222 of the toric test surface 221 in the following manner. The stage controller 170 can instruct the manipulator stage 130 to move the toric test surface 221 between the cat's eye 140 and the outer confocal position 235 along the optical axis 163, and to measure and record exact locations between these positions. At the outer confocal position 235, a radius of the spherical wave front of the test beam at the toric test surface 221 substantially matches the outer radius 222 of the toric test surface 221. Fulfillment of this matching condition results in a minimum fringe density pattern in the direction of the equator circle 220 of the torus 200, as illustrated in the interferogram 269.

Further, the interferometer mainframe 105 can acquire a set of M interferograms (similar to the interferogram 269) at the outer confocal position 235 to obtain a phase map corresponding to the minimum fringe density pattern of the interferogram 269. In some implementations, after acquiring the set of M interferograms, the nulled-fringe direction detector 190 can determine a second direction 220 perpendicular to the optical axis 163 and parallel to fringes of the minimum fringe density pattern of the interferogram 269 acquired at the outer confocal position 235.

The stage controller 170 can instruct the manipulator stage 130 to perform a lateral scan 310 in a first direction 210 perpendicular to the detected second direction 220. The lateral scan 310 of the toric test surface 221 in the first direction 210 causes a translation of the minimum fringe density pattern of the interferogram 269 along the first direction 210. As the toric test surface 221 is moved laterally in the first direction 210, the minimum fringe density pattern of the interferogram 269 translates across the field of view. As a result, interferograms 368' and 367' or 368" and 367" having corresponding translated low fringe density patterns can be acquired for corresponding lateral displacements of the toric test surface 221.

FIG. 4A (4B) shows aspects of an interferometric measurement based on rotating a toric test surface 221 to maintain a minimum fringe density pattern at the center of the field of view, at the inner (outer) confocal position 230 (235). The interferometer mainframe 105 can use a scan along the optical axis 163 to first obtain the tube (outer) radius 214 (222) of the toric test surface 221 in the following manner. The stage controller 170 can instruct the manipulator stage 130 to move the toric test surface 221 between the cat's eye 140 and the inner (outer) confocal position 230 (235) along the optical axis 163, and to measure and record exact locations between these positions. At the inner (outer) confocal position 230 (235), a radius of the spherical wave front of the test beam at the toric test surface 221 substantially matches the tube (outer) radius 214 (222) of the toric test surface 221. Fulfillment of this matching condition results in a minimum fringe density pattern in the direction of the meridian (equator) circle 210 (220) of the torus 200, as illustrated in the interferogram 261 (269).

Here, the toric test surface 221 is measured, one surface strip at a time. The interferometer mainframe 105 can acquire a set of M interferograms, similar to the interferogram 261 (269), at the inner (outer) confocal position 230 (235) to obtain a phase map corresponding to the minimum fringe density pattern of the interferogram 261 (269). In some implementations, after acquiring the set of M interferograms, the nulled-fringe direction detector 190 can determine a first (second) direction 210 (220) perpendicular to the optical axis 163 and parallel to fringes of the minimum fringe density pattern of the interferogram 261 (269) acquired at the inner (outer) confocal position 230 (235).

Then the stage controller 170 can instruct the manipulator stage 130 to perform a rotation 420 (410) of the toric test surface 221 around an axis 421 (412) parallel to the first (second) detected direction and passing through the center of the equator (meridian) circle 220 (210) of the torus 200. The rotation 420 (410) brings the next strip of the toric test surface 221 into the minimum fringe density pattern of the interferogram 261 (269), and the PSI measurement is repeated. By measuring surface strips corresponding to multiple rotational positions, the whole toric test surface 221 can be covered. The multiple surface strips obtained in this manner can be put together using a surface map stitcher 195 to obtain a distance map of the toric test surface 221.

In the examples illustrated in FIGS. 4A and 4B, the minimum fringe density pattern of the interferogram 261 (269) stays at the center of the field of view throughout the whole scan 420 (410). Accordingly, the test beam has to stay on or near to the equator 220 (a meridian 210 centered on the field of view) of the torus 200 throughout the scan 420 (410). This can be achieved by adding a rotational component to the manipulator stage 130 and ensuring that the axis of rotation 421 (412) of the added rotational component passes through the center of the equator (meridian) circle 220 (210) of the torus 200.

Figure 5:
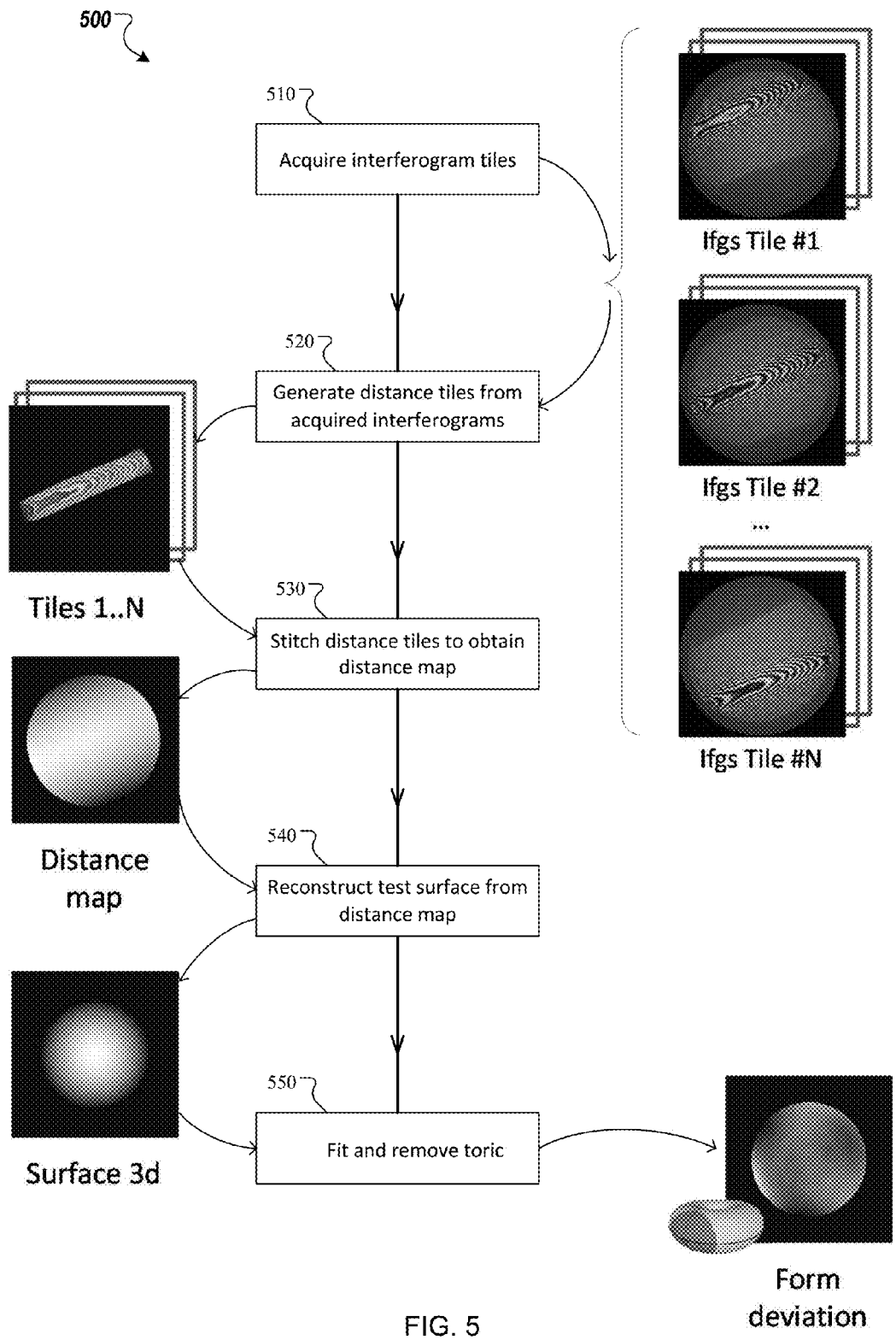
FIG. 5 shows an example of a process used to obtain a profile of a test surface.

FIG. 5 shows an example of a process 500 used to obtain a profile of a test surface. In some implementations, the process 500 can be used in conjunction with the interferometric measurement system 100 to acquire interferograms corresponding to a toric test surface and to extract shape characteristics of the toric test surface from the acquired interferograms.

At 510, a set of interferograms is recorded, such that the recorded interferograms correspond to multiple locations on the test surface. In the example illustrated in FIG. 1A, the camera 126 can be used to detect fringes on the test surface (e.g., the toric test surface 221). The fringe nuller 165 can instruct the stage controller 170 to null the detected fringes, e.g., as described above in connection with FIG. 1B. The nulled fringes can overlay a tile (portion) of the test surface at a given location within the field of view of the camera 126. Further, the nulled-fringe direction detector 190 can detect a first direction of the nulled fringes. Furthermore, the interferogram acquirer 160 can acquire M (M≥3, typically 13-15) interferograms associated with the given position. In this manner, the M acquired interferograms can be used by the phase map generator 180 to generate a phase tile associated with the surface tile at the given location and corresponding to a first curvature of the test surface along the detected first direction.

The stage controller 170 can instruct the manipulator stage 130 to laterally translate, rotate or tip/tilt the test surface to laterally displace the nulled fringes in a direction perpendicular to the detected first direction to N other locations within the field of view of the camera 124. Moreover, M additional interferograms are acquired at each of the N other locations to generate phase tiles associated with respective surface tiles at the N other locations and corresponding to the first curvature.

At 520, the acquired interferograms are processed to generate distance tiles, where the distance represents a difference between the test surface and a spherical reference surface (e.g., 119 in FIG. 1A.) The phase map generator 180 can preprocess the acquired interferograms to correct for distortion and compensate for inherent image motion. For instance, while the test part is being scanned, fringe phase can change very quickly, but the image of the test surface on the camera 126 also can move at a lower rate. Accordingly, data processing algorithms can be used to compensate for the image motion of the acquired interferograms, as described below.

The phase map generator 180 can use the M corrected interferograms corresponding to each surface tile of the test surface, in accordance with equation (1), to generate a phase map associated with the surface tile. A quantity of N phase maps corresponding to N surface tiles of the test surface can be generated in this manner. At this stage, potential systematic interferometer errors (e.g., calibration errors) can be removed from the generated phase maps. In addition, pixels whose phase slope is over a specified threshold can be masked (filtered out) to obtain clean phase maps. In this fashion, the portion of the phase map corresponding to the minimum fringe density can be retained for further processing. Further, the processed phase maps can be corrected for distortion. Furthermore, the image motion can be compensated. Additionally, the piston term of the processed phase maps can be reconstructed using the measured macroscopic distance between the cat's eye position 140 and one of the confocal positions 230, 235. Moreover, the surface map generator 185 can scale the N processed phase maps by $\lambda/2\pi$ to obtain N distance tiles that cover the test surface in the field of view of the camera 124.

At 530, the N distance tiles are stitched together to obtain a full-field distance map of the test surface. This is the map that would be measured by the interferometer if all the fringes could be resolved at the same time. A surface map stitcher 195 can place the N distance tiles in a common coordinate system and can stitch adjacent tiles together using stitching algorithms known in the art.

For example, a global distance map can be generated by stitching N distance tiles $\{z_1, z_2, \ldots, z_N\}$, where $z_i$, (i=1, 2, \ldots, N) represents a distance tile corresponding to a surface tile "i". For non-overlapping regions, the distance map is $z_i + a_i x + b_i y + c_i$, and for overlapping regions, the distance map is the average of $z_i + a_i x + b_i y + c_i$. The coefficients $a_i$, $b_i$, and $c_i$ can be found by minimizing a positive values function, $\chi^2$ $$\chi^2 = f_{k \in i,j}(\Delta_{ij}^{(k)} + (a_i - a_j)x_k + (b_i - b_j)y_k + (c_i - c_j))^2 \quad (2),$$

with $\Delta_{ij}^{(k)} = z_i^{(k)} - z_j^{(k)}$, where the index k refers to pixels and the summations are taken over the overlapping regions of the distance tiles.

At 540, the measured test surface is reconstructed from the global distance map. For example, a global surface map analyzer 197 can use the measured distance between each of the inner 230 and outer 235 confocal positions and the cat's eye position 140, to convert the global distance map into a full 3d reconstructed toric test surface 221. In this manner, the distances in the global surface map can be converted to absolute z-values and further interpolated to an output grid to provide surface profile data.

At 550, the nominal or best matching toric is fitted to the reconstructed test surface. The global surface map analyzer 197 can use fitting algorithms to fit a best matching toric surface (also referred to as the fitted toric) to the surface profile data. For example, the tube radius 214 and the outer radius 222 of the toric test surface can be obtained in this manner. Removing this fitted toric can yield a deviation to this surface (form deviation of the toric test surface) which can be a primary measurement result of the interferometry technique described in this specification. Also, deviation from a nominal torus surface can be calculated using the surface profile data and the radii of the toric obtained from measurements. Both fitting techniques can provide a deviation map and either one can be chosen for analysis. In addition, the global surface map analyzer 197 can obtain misalignments using the fitted toric.

FIG. 6 shows measured form deviations of a toric test surface obtained using the process 500 at the outer confocal position 235 and inner confocal position 230. The measured form deviation map 691' is obtained by scanning at the outer confocal position 235. A fit to the first 36 Zernike polynomials can be subtracted from the form deviation 691' to obtain just the high-frequency components of the form deviation 693'. The measured form deviation 691" is obtained by scanning at the inner confocal position 230. A fit to the first 36 Zernike polynomials can be subtracted from the distance map 691" to obtain just the high-frequency components of the form deviation 693". Comparison of the measured form deviations 691' and 691" (or of the high frequency versions 693' and 693") show that similar deviation maps can be obtained using the technologies described in this specification when the interferograms are matched to the outer or tube curvature of the toric test surface. Accordingly, the process 500 can be implemented at either one of the inner 230 or outer 235 confocal positions.

Figure 7:
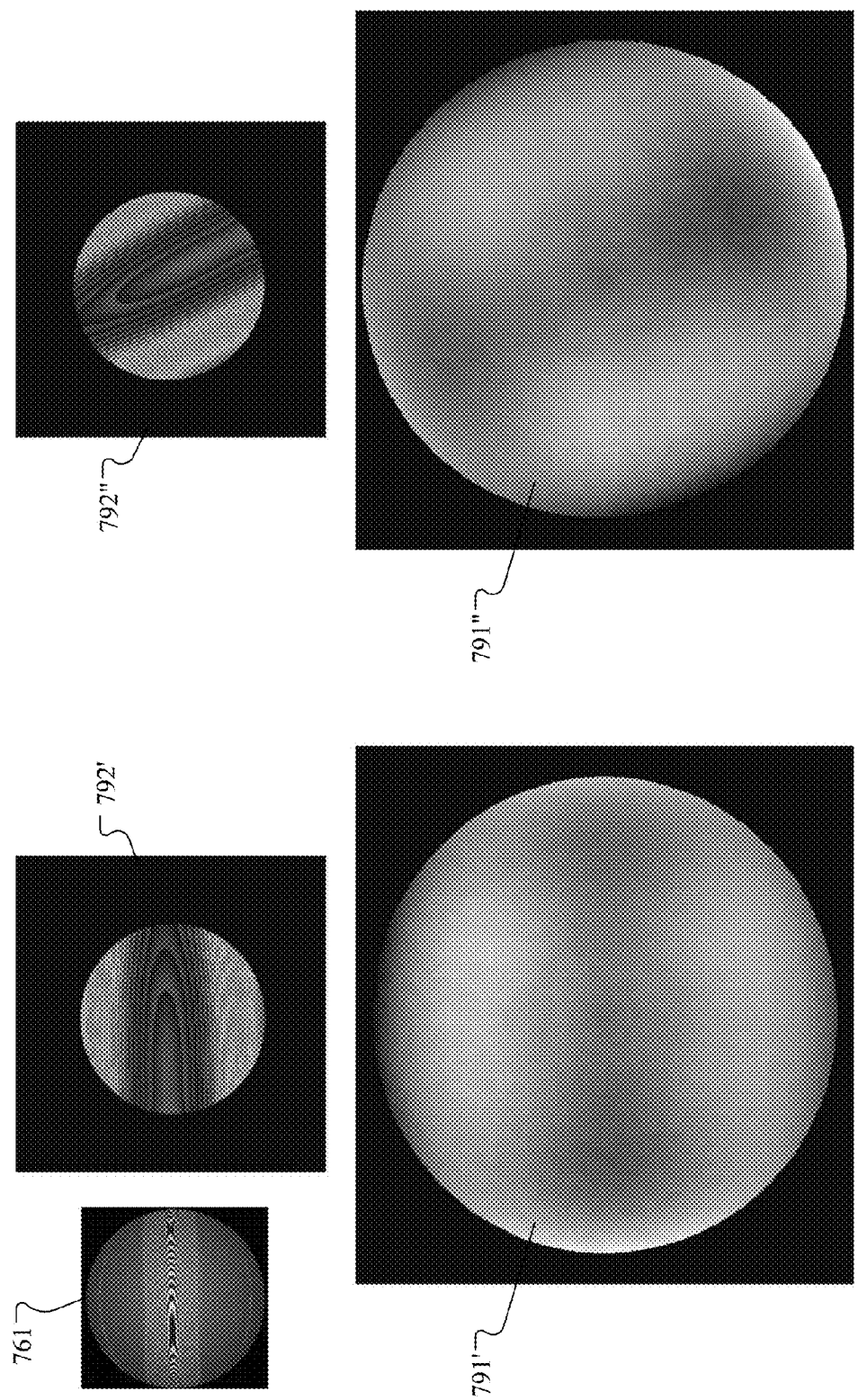
FIG. 7 shows form deviations for two different orientations of a test surface.

FIG. 7 shows surface maps obtained by process 500, measured in two orientations of the test surface. In some implementations, artifacts occurring in the data processing may be identified by carrying out another set of measurements after rotating a test surface with respect to the z-axis. Characteristics intrinsic to the test surface are rotated by the same angle, but artifacts in the data processing are not be rotated. At 520, a series of interferograms 761 (only one is shown) and a corresponding phase map 792' is generated at a first orientation of the test surface. A form deviation map 791' is generated, at 530, by stitching multiple phase maps similar to phase map 792'. For comparison, the test surface is rotated along the z-axis by about 70° and process 500 is carried out again. At 520, a series of phase maps 792" (only one is shown) is recorded at the second orientation. At 530, a form deviation map 791" is obtained by stitching multiple phase maps similar to phase map 792", reconstructing the surface and fitting and subtracting an ideal toric surface. Form deviation maps 791' and 791" appear to be rotated with respect to each other (following the rotation of the test surface) and no artifact can be observed. In this manner, it is confirmed that a deviation map corresponding to the difference between the toric test surface and an ideal toric surface rotates (as expected) in accordance to the two orientations of the toric test surface when the latter was measured.

Figure 8:
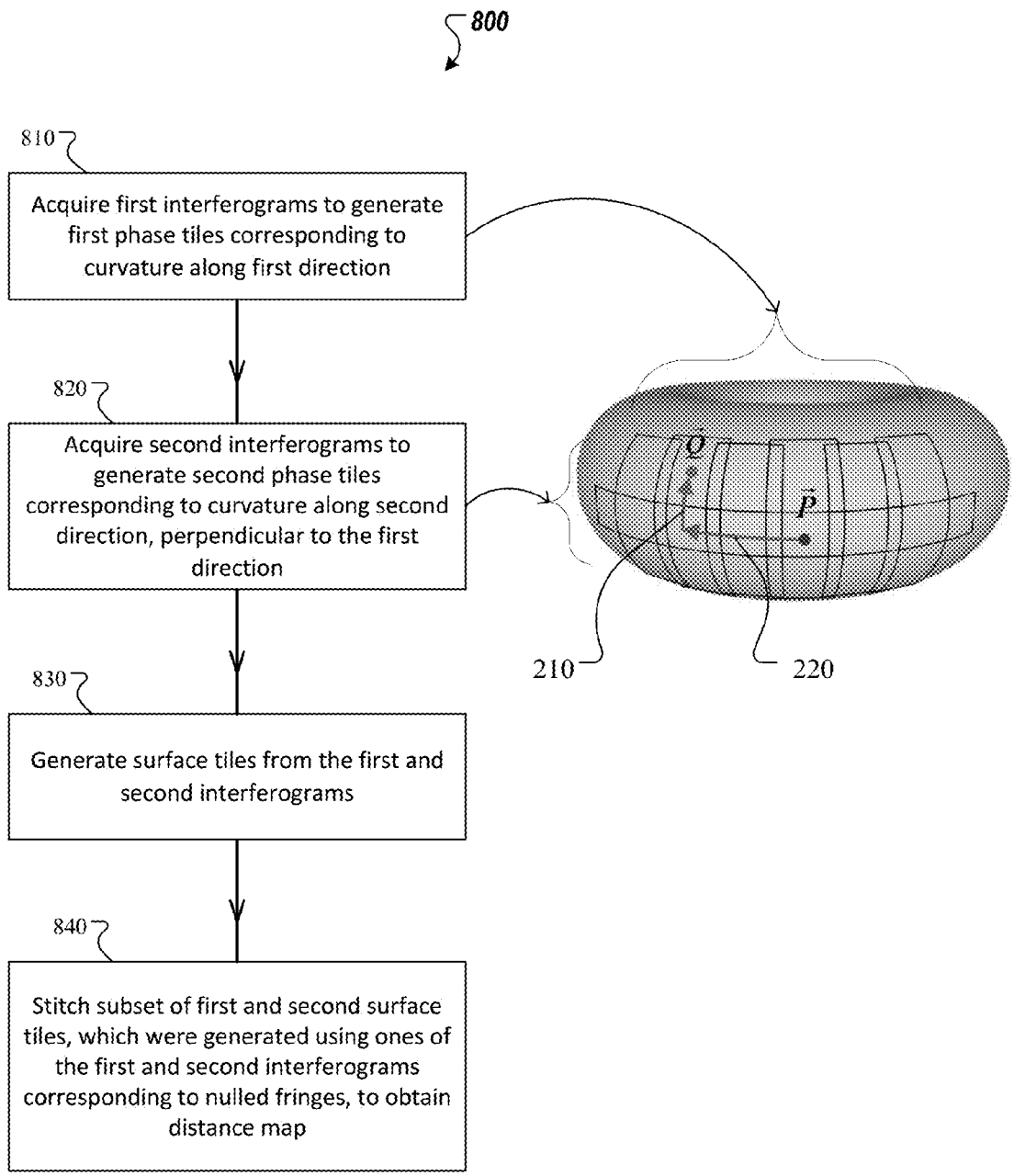
FIG. 8 shows an example of a process used to obtain a distance map of a test surface by scanning in two orthogonal directions.

FIG. 8 shows an example of another process 800 that is used to determine shape of a test surface. In some implementations the process 800 can be implemented using the interferometric system 100 to obtain a distance map for a toric test surface. In general, a single scan of the surface is sufficient for reconstructing the whole surface of the toric test surface, in accordance with process 500, regardless whether the single scan is executed at the inner 230 or outer 235 confocal positions. In some implementations, the data obtained from both the inner 230 and outer 235 confocal scans can be combined such that every point on the surface can be reached by choosing a path of nulled fringes. Since the fringes are orthogonal with respect to each other at the inner 230 and outer 235 confocal positions, data from the inner confocal position 230 can be used for guided stitching of the data from the outer confocal position 235, and vice versa. In the example illustrated in FIG. 8, a first point P at the inner confocal position 230 is chosen so that the scan runs along the equator 220 corresponding to the outer radius 222 of a torus 200, and a second point Q at the outer confocal position 235 is chosen so that the scan runs along a meridian 210 corresponding to the tube radius 214 of the torus 200 to a desired surface point. In this example, a continuous path of minimum fringe density (e.g., corresponding to nulled fringes) connects the two points P and Q and the common path principle can be fulfilled for the path, which can reduce interferometer errors. In this manner, the whole surface of the toric test surface 221 can be stitched together using data from the first and second directions 210 and 220, improving the measurement accuracy.

At 810, first interferogram tiles are acquired to generate phase tiles corresponding to curvature along a first direction 210 in accordance with step 520 of process 500. In the example shown in FIG. 1A, the fringe nuller 165 can be used in conjunction with the stage controller 170 to obtain first minimum fringe density pattern (e.g., nulled fringes) at the inner confocal position 230, at point P on the test surface. The interferogram acquirer 160 can acquire a set of first interferogram tiles that corresponds to the first minimum fringe density pattern, at the point P. Further, a nulled-fringe direction detector 190 can detect a first direction 210 of fringes of the first minimum fringe density pattern at the inner confocal position 230, at the point P. Then, the stage controller 170 can laterally displace, rotate or tip/tilt the test surface to move the first minimum fringe density pattern (e.g., the nulled fringes) along a second direction 220 perpendicular to the first direction 210. In this manner, the interferogram acquirer 160 can record additional sets of first interferogram tiles that correspond to first minimum fringe density patterns at locations of the test surface corresponding to displacements along the second direction 220 perpendicular to the first detected direction 210. One of the additional sets of first interferogram tiles is acquired at point Q on the test surface.

At 820, second interferograms are acquired to generate phase tiles corresponding to curvature along a second direction 220, perpendicular to the first direction 210 in accordance with step 520 of process 500. In the example illustrated in FIG. 1A, the fringe nuller 165 can be used in conjunction with the stage controller 170 to obtain second minimum fringe density pattern (e.g., nulled fringes) at the outer confocal position 235, at point P on the test surface. The interferogram acquirer 160 can acquire a set of second interferogram tiles that corresponds to the second minimum fringe density pattern, at the point P. Further, the nulled-fringe direction detector 190 can detect a second direction 220 of fringes of the second minimum fringe density pattern at the outer confocal position 235, at the point P. Then, the stage controller 170 can laterally displace, rotate or tip/tilt the test surface to move the second minimum fringe density pattern along the first direction 210 perpendicular to the second direction 220. In this manner, the interferogram acquirer 160 can record additional sets of second interferogram tiles of second minimum fringe density at locations of the test surface corresponding to displacements along the first direction 210 perpendicular to the second direction 220. One of the additional sets of second interferogram tiles is acquired at point Q on the test surface.

At 830, the acquired sets of first and second interferograms for the first and second directions 210, 220 are processed by the phase map generator 180 and surface map generator 185 to generate corresponding first and second surface tiles oriented in the first and second orthogonal directions 210 and 220, respectively.

At 840, some of first and second surface tiles which are generated using sets of the first and second interferograms that correspond to first and second minimum fringe density patterns are stitched by a surface map stitcher 195 to generate a distance map of the test surface, in accordance with step 530 of process 500. In this way, by combining first and second surface tiles generated based on inner 230 and outer 235 confocal measurements, it is possible to connect any two points P and Q on a toric test surface by a minimum fringe density path. In this manner, interferometric errors may be eliminated.

In some implementations, reconstructing the surface from a single scan can be preferred for throughput reasons. In these implementations, deviations from the common path principle cannot be avoided entirely. However, a single scan measurement in accordance with process 500 can be improved by calibrating the interferometer mainframe 105 for retrace or distortion errors. This widens the capture range of the instrument around the common path condition which still is the working point of the method 500. Measurement accuracies can be further improved for a single scan implementation, by calibrating and subtracting the reference surface from each individual phase measurement.

The techniques described in this specification for reconstructing shape of a toric test surface by lateral, tilt or rotational motion can be implemented using other interferometers that generate a spherical test wave front and measure the wave front returned from the test surface. Examples of such interferometers are Fizeau interferometers, Twyman-Green interferometers, Mach-Zehnder interferometers, etc. In addition, the disclosed techniques can be used in conjunction with other methods for measuring wave fronts such as Hartmann sensors, Shack-Hartmann sensors, shearing interferometers, deflectometry sensors, knife-edge methods, etc.

Further, the disclosed techniques can be implemented using monochromatic illumination as well as broadband or multiple wavelength illumination. When using broadband or multiple wavelength illumination, the disclosed techniques can be used to measure the absolute cavity distance and allow determining the toric surface radii directly, without having to measure the distance between the cat's eye and either the inner 230 or outer 235 confocal positions. In some implementation, such a system may only need one axis of motion for scanning the test surface. This aspect of measuring the absolute distance is also useful if the relation between disconnected surfaces or surfaces with steps have to be characterized.

In addition, the disclosed methods are applicable across the whole spectrum of optical wavelengths, ranging from the UV to the IR. In particular, implementations in the infrared spectral range can be attractive when measuring parts with large surface roughness for which the interferometric phase becomes undefined in the visible spectrum because of the speckle effect.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. An interferometry method comprising:
   (a) directing a test beam comprising a spherical wave front along an optical axis to reflect from a test surface;
   (b) combining the test beam reflected from the test surface with a reference beam to form an interferogram on a detector, wherein the test and reference beams are derived from a common source; and
   (c) recording the interferogram for each of multiple lateral displacements of the test surface relative to the optical axis,
      (1) wherein for each recorded interferogram, the curvature of the spherical wave front at the test surface substantially matches a local curvature of the test surface along a first axis orthogonal to the optical axis,
      (2) wherein the multiple lateral displacements of the test surface each comprise a component along a second axis orthogonal to each of the first axis and the optical axis, and
      (3) wherein the local curvature of the test surface along the first axis is different from a local curvature of the test surface along the second axis, and the test surface is non-rotationally symmetric.

2. The method of claim 1, wherein at least some of the multiple lateral displacements are caused by moving the test surface along the second axis.

3. The method of claim 1, wherein at least some of the multiple lateral displacements are caused by rotating the test surface about the first axis or an axis parallel to the first axis.

4. The method of claim 1, further comprising using an electronic processor to determine a global surface profile for the test surface based on the recorded interferograms.

5. The method of claim 4, wherein the electronic processor determines the global surface profile by
   (a) determining, for each of the multiple lateral displacements, a local surface profile from corresponding ones of the recorded interferograms, and
   (b) stitching together the local surface profiles.

6. The method of claim 5, wherein the stitching by the electronic processor removes differences in tip, tilt, and piston for the local surface profiles.

7. The method of claim 1, further comprising recording an additional interferogram for each of additional, multiple lateral displacements of the test surface relative to the optical axis, wherein for each of the additional recorded interferograms, the curvature of the spherical wave front at the test surface substantially matches a local curvature of the test surface along the second axis, and the additional multiple lateral displacements each comprise a component along the first axis.

8. The method of claim 7, further comprising using an electronic processor to determine a global surface profile for the test surface based on the initial set of recorded interferograms and the additional set of recorded interferograms.

9. The method of claim 1, wherein the test surface comprises a toric surface.

10. The method of claim 1, wherein the test surface comprises an atoric surface.

11. An interferometry system for characterizing a test surface, the system comprising:
    (a) a detector;
    (b) an interferometer coupled to the detector, the interferometer comprising a mount to adjustably position the test surface, the interferometer being configured to
       (1) direct a test beam comprising a spherical wave front along an optical axis to reflect from the test surface, and
       (2) combine the reflected test beam with a reference beam to form an interferogram on the detector, wherein the test and reference beams are derived from a common source; and
    (c) an electronic processor coupled to the detector and the interferometer, the electronic processor being programmed to
       (1) determine a first axis of the test surface based on the interferogram formed on the detector when a curvature of the spherical wave front at the test surface substantially matches a local curvature of the test surface along the determined first axis,
       (2) instruct the mount to displace the test surface relative to the optical axis such that each of multiple displacements of the test surface comprises a component along a second axis orthogonal to each of the optical axis and the determined first axis, wherein a local curvature of the test surface along the second axis is different from the local curvature of the test surface along the determined first axis, and the test surface is non-rotationally symmetric,
       (3) record the interferogram for each of the multiple lateral displacements of the test surface, and
       (4) reconstruct the test surface based on the interferograms recorded in (3) to obtain a three-dimensional test surface that is non-rotationally symmetric.

12. The system of claim 11, wherein to determine the first axis of the test surface, the electronic processor is programmed to
    (A) instruct the mount to displace the test surface along the optical axis and to tip/tilt the test surface with respect to the optical axis, such that the interferogram formed by the interferometer on the detector has a first minimum density of fringes,
    (B) detect a direction of fringes of the interferogram that has the first minimum density of fringes, and
    (C) assign the detected direction to the first axis.

13. The system of claim 11, wherein at least some of the multiple displacements of the test surface are translations along the second axis.

14. The system of claim 11, wherein at least some of the multiple displacements of the test surface are rotations about the first axis.

15. The system of claim 11, wherein the electronic processor is further programmed to determine a global surface profile for the test surface based on the recorded interferograms.

16. The system of claim 15, wherein to determine the global surface profile, the electronic processor is programmed to (A) determine, for each of the multiple displacements, a local surface profile from corresponding ones of the recorded interferograms, and (B) stitch together the local surface profiles.

17. The system of claim 11, wherein the electronic processor is further programmed to (1) instruct the mount to additionally displace the test surface relative to the optical axis, such that each of multiple additional displacements of the test surface comprises a component along the first axis, and (2) for each of the additional multiple displacements, record an additional interferogram formed on the detector when the curvature of the spherical wave front at the test surface substantially matches the local curvature of the test surface along the second axis.

18. The system of claim 17, wherein to record the additional interferogram, the electronic processor is further programmed to instruct the mount to displace the test surface along the optical axis and to tip/tilt the test surface with respect to the optical axis, such that the additional interferogram formed by the interferometer on the detector has a second minimum density of fringes.

19. The system of claim 17, wherein the electronic processor is further programmed to determine a global surface profile for the test surface based on the initially recorded interferograms and the additionally recorded interferograms.

20. The system of claim 11, wherein the test surface comprises a toric surface.

21. The system of claim 11, wherein the test surface comprises an atoric surface.

22. An interferometry method for characterizing an atoric test surface, the method comprising:

(a) directing a test beam comprising a spherical wave front along an optical axis to reflect from the atoric test surface;

(b) combining the test beam reflected from the atoric test surface with a reference beam to form an interferogram on a detector, wherein the test and reference beams are derived from a common source; and (c) recording the interferogram for each of multiple lateral displacements of the atoric test surface relative to the optical axis, wherein the atoric test surface is non-rotationally symmetric.

23. The method of claim 22, (a) wherein for each recorded interferogram, the curvature of the spherical wave front at the atoric test surface substantially matches a local curvature of the atoric test surface along a first axis orthogonal to the optical axis, and (b) wherein the multiple lateral displacements of the atoric test surface each comprise a component along a second axis orthogonal to each of the first axis and the optical axis, the local curvature of the atoric test surface along the first axis is different from a local curvature of the atoric test surface along the second axis.

24. An interferometry method for characterizing a toric test surface, the method comprising:

(a) directing a test beam comprising a spherical wave front along an optical axis to reflect from the toric test surface;

(b) combining the test beam reflected from the toric test surface with a reference beam to form an interferogram on a detector, wherein the test and reference beams are derived from a common source; and (c) recording the interferogram for each of multiple lateral displacements of the toric test surface relative to the optical axis, wherein the toric test surface is non-rotationally symmetric.

25. The method of claim 24, (a) wherein for each recorded interferogram, the curvature of the spherical wave front at the toric test surface substantially matches a local curvature of the toric test surface along a first axis orthogonal to the optical axis, and (b) wherein the multiple lateral displacements of the toric test surface each comprise a component along a second axis orthogonal to each of the first axis and the optical axis, the local curvature of the toric test surface along the first axis is different from a local curvature of the toric test surface along the second axis.

* * * * *

UNITED STATES PATENT AND TRADEMARK OFFICE
CERTIFICATE OF CORRECTION

| | | |
|---|---|---|
| PATENT NO. | : 9,435,640 B2 | |
| APPLICATION NO. | : 14/559257 | |
| DATED | : September 6, 2016 | |
| INVENTOR(S) | : Thomas Dresel | |

It is certified that error appears in the above-identified patent and that said Letters Patent is hereby corrected as shown below:

In the Specification

<u>Column 1</u>

Line 11 (Approx.), delete "ASSYMETRIC" and insert -- ASYMMETRIC --

Line 13 (Approx.), delete "5" after the words "herein incorporated"

Signed and Sealed this
Eleventh Day of April, 2017

Michelle K. Lee
*Director of the United States Patent and Trademark Office*